United States Patent
Kobayashi et al.

(10) Patent No.: US 11,014,855 B2
(45) Date of Patent: May 25, 2021

(54) TRANSPARENT ALN SINTERED BODY AND METHOD FOR PRODUCING THE SAME

(71) Applicant: NGK INSULATORS, LTD., Nagoya (JP)

(72) Inventors: Yoshimasa Kobayashi, Nagoya (JP); Hiroharu Kobayashi, Kasugai (JP); Kazuki Iida, Nagoya (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/419,313

(22) Filed: May 22, 2019

(65) Prior Publication Data

US 2019/0270676 A1     Sep. 5, 2019

Related U.S. Application Data

(63) Continuation of application No. PCT/JP2017/045765, filed on Dec. 20, 2017.

(30) Foreign Application Priority Data

Dec. 21, 2016 (JP) .............................. JP2016-247874
Jul. 10, 2017 (WO) .................. PCT/JP2017/025085

(51) Int. Cl.
| | | |
|---|---|---|
| *C04B 35/581* | (2006.01) | |
| *C04B 35/645* | (2006.01) | |
| *C01B 21/072* | (2006.01) | |
| *C01F 7/16* | (2006.01) | |
| *C04B 35/626* | (2006.01) | |

(52) U.S. Cl.
CPC .......... *C04B 35/581* (2013.01); *C01B 21/072* (2013.01); *C01F 7/164* (2013.01); *C04B 35/62685* (2013.01); *C04B 35/645* (2013.01); *C04B 2235/3208* (2013.01); *C04B 2235/3217* (2013.01); *C04B 2235/3222* (2013.01); *C04B 2235/3224* (2013.01); *C04B 2235/3865* (2013.01); *C04B 2235/528* (2013.01); *C04B 2235/5292* (2013.01); *C04B 2235/5296* (2013.01); *C04B 2235/5436* (2013.01); *C04B 2235/5472* (2013.01); *C04B 2235/656* (2013.01); *C04B 2235/6567* (2013.01); *C04B 2235/661* (2013.01); *C04B 2235/72* (2013.01); *C04B 2235/723* (2013.01); *C04B 2235/77* (2013.01); *C04B 2235/786* (2013.01); *C04B 2235/787* (2013.01); *C04B 2235/85* (2013.01); *C04B 2235/9653* (2013.01)

(58) Field of Classification Search
CPC .................................................. C04B 35/581
See application file for complete search history.

(56) References Cited

U.S. PATENT DOCUMENTS

| | | | |
|---|---|---|---|
| 4,847,221 A | 7/1989 | Horiguchi et al. | |
| 7,081,425 B2 * | 7/2006 | Kanechika | ............ C04B 35/581 |
| | | | 501/98.4 |
| 8,703,041 B2 * | 4/2014 | Kaito | ................... C04B 41/009 |
| | | | 264/668 |
| 2005/0070421 A1 | 3/2005 | Kanechika et al. | |
| 2005/0215415 A1 | 9/2005 | Hattori | |
| 2010/0183860 A1 | 7/2010 | Kaito et al. | |
| 2015/0353355 A1 | 12/2015 | Fukunaga et al. | |
| 2020/0010374 A1 * | 1/2020 | Kobayashi | ............ C04B 35/581 |

FOREIGN PATENT DOCUMENTS

| | | |
|---|---|---|
| CN | 104955769 A | 9/2015 |
| EP | 1 518 843 A2 | 3/2005 |
| EP | 2 955 156 A1 | 12/2015 |
| JP | S63-134569 A1 | 6/1988 |
| JP | S63-206360 A1 | 8/1988 |
| JP | 2005-119953 A1 | 5/2005 |
| JP | 2013-189319 A1 | 9/2013 |
| JP | 5366811 B2 | 12/2013 |
| TW | 201446642 A | 12/2014 |
| WO | 2009/031510 A1 | 3/2009 |
| WO | 2012/002545 A1 | 1/2012 |
| WO | 2014/123247 A1 | 8/2014 |

OTHER PUBLICATIONS

U.S. Appl. No. 16/420,334, filed May 23, 2019, Kobayashi, et al.
English translation of International Preliminary Report on Patentability (Chapter I) (Application No. PCT/JP2017/045765) dated Jul. 4, 2019.
Extended European Search Report (Application No. 17885115.0) dated May 14, 2020.
Proceedings of the 29th Fall Meeting, issued by The Ceramic Society of Japan, 2016, Program No. 3B17.
International Search Report (Application No. PCT/JP2017/045765) dated Jan. 30, 2018.

* cited by examiner

*Primary Examiner* — Karl E Group
(74) *Attorney, Agent, or Firm* — Burr & Brown, PLLC

(57) ABSTRACT

In a first step of a method for producing a transparent AlN sintered body, first, a formed body is prepared by forming a mixture obtained by mixing a sintering aid with an AlN raw-material powder containing a plate-like AlN powder whose plate surface is a c-plane and which has an aspect ratio of 3 or more. At this time, the mixture is formed such that the plate surface of the plate-like AlN powder is disposed along a surface of the formed body. In a second step, an oriented AlN sintered body is obtained by subjecting the formed body to hot-press sintering in a non-oxidizing atmosphere while applying a pressure to the surface of the formed body. In a third step, a transparent AlN sintered body is obtained by sintering the oriented AlN sintered body at normal pressure in a non-oxidizing atmosphere to remove a component derived from the sintering aid.

11 Claims, 3 Drawing Sheets

TRANSPARENT AlN SINTERED BODY AND METHOD FOR PRODUCING THE SAME

BACKGROUND OF THE INVENTION

1. Field of the Invention

The present invention relates to a transparent AlN sintered body and a method for producing the same.

2. Description of the Related Art

Transparent materials such as transparent resins, glass, quartz, transparent YAG sintered bodies, transparent ALON sintered bodies, and transparent spinel sintered bodies are known. However, these transparent materials each have a thermal conductivity of about 30 W/mK or less, and no material that is transparent and that has a high thermal conductivity is known. Meanwhile, AlN has a high thermal conductivity and thus is used as a heat-dissipating substrate and the like, however, typical AlN sintered bodies are opaque. Examples of the factor of the opaqueness in AlN sintered bodies include the following. (1) Pores, different phases, solid-solution impurities, and the like are present. (2) Since AlN has the wurtzite crystal structure, AlN optically has crystal anisotropy. Therefore, in a sintered body having a random crystal orientation, scattering due to birefringence occurs at grain boundaries.

Light-transmissive AlN sintered bodies are being developed in recent years. For example, in PTL 1, an AlN sintered body having a total light transmittance of about 70% and an in-line transmittance of 13.5% at a wavelength of 600 nm is obtained by controlling the amount of metal impurities, the oxygen concentration, and the density. In NPL 1, an oriented AlN sintered body is produced by performing forming in a rotating magnetic field, and sintering the resulting formed body. This oriented AlN sintered body has a c-axis orientation of about 0.7 as determined by using Lotgering and a total light transmittance of about 60% at a wavelength of 600 nm.

CITATION LIST

Patent Literature

PTL 1: Japanese Patent No. 5366811

Non Patent Literature

NPL 1: Proceedings of the 29th Fall Meeting, issued by The Ceramic Society of Japan, 2016, Program number: 3B17

SUMMARY OF THE INVENTION

However, the AlN sintered bodies disclosed in PTL 1 and NPL 1 merely have a certain degree of light transparency. Therefore, the development of more transparent AlN sintered bodies has been desired.

The present invention has been made in order to solve the problem described above. A main object of the present invention is to provide an AlN sintered body that is more transparent than existing AlN sintered bodies.

A method for producing a transparent AlN sintered body according to the present invention includes a first step of preparing a formed body by forming a mixture obtained by mixing a sintering aid with an AlN raw-material powder containing a plate-like AlN powder whose plate surface is a c-plane, the mixture being formed such that the plate surface of the plate-like AlN powder is disposed along a surface of the formed body, a second step of obtaining an oriented AlN sintered body by subjecting the formed body to hot-press sintering in a non-oxidizing atmosphere while applying a pressure to the surface of the formed body, and a third step of obtaining a transparent AlN sintered body by sintering the oriented AlN sintered body at normal pressure in a non-oxidizing atmosphere to remove a component derived from the sintering aid.

In the method for producing a transparent AlN sintered body, a formed body is formed such that a plate surface (c-plane) of a plate-like AlN powder is disposed along a surface of the formed body. This formed body contains a sintering aid. In hot-press sintering of the formed body, the formed body is subjected to hot-press sintering in a non-oxidizing atmosphere while applying a pressure to the surface of the formed body, that is, while applying a pressure to the formed body from a direction substantially perpendicular to the surface of the formed body. Consequently, sintering of an AlN raw-material powder containing the plate-like AlN powder is promoted by the sintering aid. Furthermore, since the plate surface (c-plane) of the plate-like AlN powder is arranged along the surface of the formed body, the sintering proceeds while the plate-like AlN powder functions as a template. As a result, an oriented AlN sintered body having a high degree of c-plane orientation is obtained. However, this oriented AlN sintered body has low transparency because a component derived from the sintering aid is present between AlN sintered grains. Accordingly, this oriented AlN sintered body is sintered at normal pressure in a non-oxidizing atmosphere to remove the component derived from the sintering aid. The AlN sintered body obtained in this manner is more transparent than existing AlN sintered bodies.

A transparent AlN sintered body according to the present invention is a transparent AlN sintered body having a polycrystalline structure, in which a degree of c-plane orientation is 70% or more as determined by a Lotgering method, and an in-line transmittance at a wavelength of 450 nm is 48% or more.

This transparent AlN sintered body has a high degree of c-plane orientation and thus has good plasma resistance and piezoelectric properties. Since the transparent AlN sintered body has a high in-line transmittance, the transparent AlN sintered body is more transparent than existing AlN sintered bodies. Furthermore, properties inherent to AlN, such as high thermal conductivity, high refractive index, and high crystallinity, are maintained as they are. Such a transparent AlN sintered body can be suitably produced by the above method for producing a transparent AlN sintered body.

DETAILED DESCRIPTION OF THE INVENTION

Figure 1A:
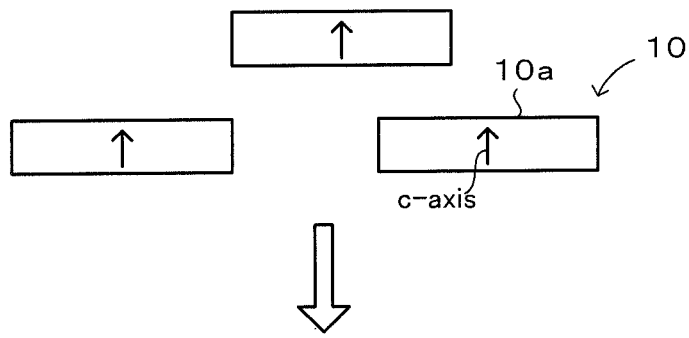
FIGS. 1A to 1D include explanatory views illustrating an example of steps of producing an AlN sintered body by a TGG method.
Figure 1B:
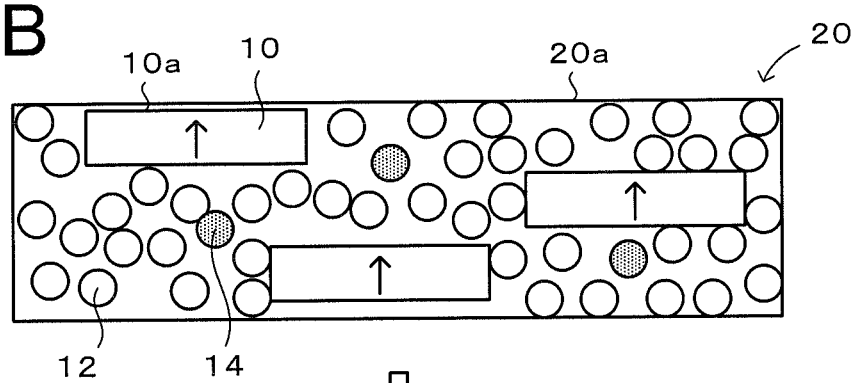
Figure 1C:
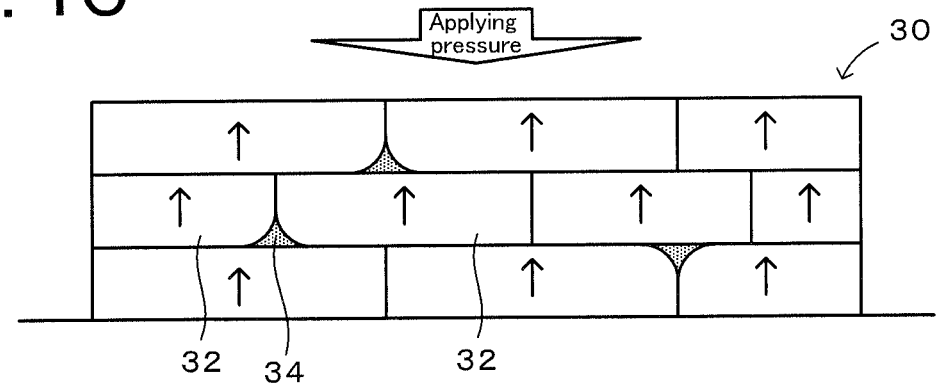
Figure 1D:
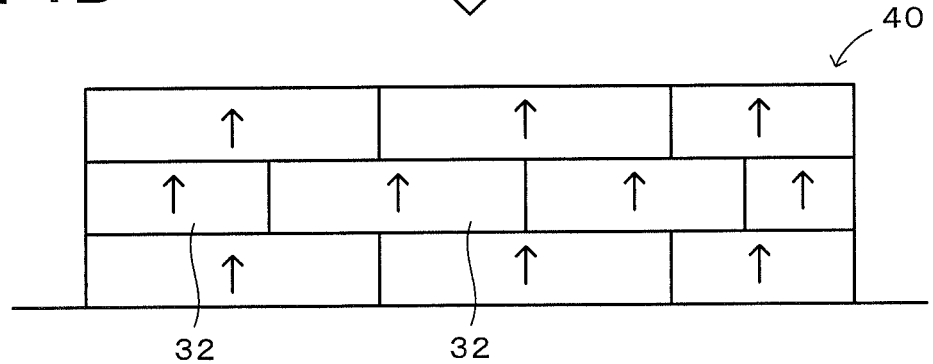

A preferred embodiment of the present invention will be described below.

A method for producing a transparent AlN sintered body according to the present embodiment includes a first step of preparing a formed body by forming a mixture obtained by mixing a sintering aid with an AlN raw-material powder containing a plate-like AlN powder whose plate surface is a c-plane, the mixture being formed such that the plate surface of the plate-like AlN powder is disposed along a surface of the formed body, a second step of obtaining an oriented AlN sintered body by subjecting the formed body to hot-press sintering in a non-oxidizing atmosphere while applying a pressure to the surface of the formed body, and a third step of obtaining a transparent AlN sintered body by sintering the oriented AlN sintered body at normal pressure in a non-oxidizing atmosphere to remove a component derived from the sintering aid.

The plate-like AlN powder is an AlN powder whose plate surface is a c-plane. The plate-like AlN powder preferably has an aspect ratio of 3 or more. The aspect ratio refers to average particle size/average thickness. Herein, the average particle size is an average of the plate surface in a long-axis direction, and the average thickness is an average of a short-axis length of a particle. The use of the AlN raw-material powder that contains a plate-like AlN powder having an aspect ratio of 3 or more increases the degree of c-plane orientation of an AlN sintered body that is finally obtained. The aspect ratio is preferably 5 or more. The average particle size of the plate-like AlN powder is preferably large from the viewpoint of achieving high orientation, and the average particle size is preferably 2 µm or more, preferably 5 µm or more, and more preferably 7 µm or more. However, the average particle size of the plate-like AlN powder is preferably small from the viewpoint of densification, and the average particle size is preferably 20 µm or less and more preferably 10 µm or less. In view of the above, the average particle size is preferably 2 to 20 µm in order to realize both high orientation and densification. From the viewpoint of the ease of preparation of the plate-like AlN powder, the average thickness is preferably 0.05 µm or more, preferably 0.07 µm or more, more preferably 0.1 µm or more, more preferably 0.3 µm or more, more preferably 0.5 µm or more, and still more preferably 0.8 µm or more. On the other hand, from the viewpoint of the ease of orientation of the plate-like AlN powder, the average thickness is preferably 1.8 µm or less, more preferably 1.5 µm or less, more preferably 1 µm or less, and still more preferably 0.5 µm or less. In the case where the plate-like AlN powder has an excessively large average thickness, for example, when the thickness of a formed body before sintering is adjusted by using a doctor blade or the like, a ratio of a shear stress that is received by side surfaces (surfaces parallel to the thickness direction) of plate-like AlN particles relative to a total shear stress applied from the blade to the particles increases, and consequently, the orientation of the plate-like AlN particles may be disordered. In view of this, the average thickness is preferably 0.05 to 1.8 µm in order to realize both the ease of preparation and the ease of orientation of the plate-like AlN powder. Preferably, the particles constituting the plate-like AlN powder do not agglomerate, are separated from each other, and are each present in the form of a single particle. In order to cause the particles constituting the plate-like AlN powder to be present in the form of a single particle, at least one treatment of a classification treatment, a disintegration treatment, and an elutriation treatment is employed. An example of the classification treatment is air-stream classification. Examples of the disintegration treatment include pot disintegration and wet-type atomization. The elutriation treatment is preferably employed when fine particles are mixed. Whether or not particles constituting the plate-like AlN powder are present in the form of a single particle can be determined on the basis of an image obtained with a wet flow-type particle size/shape analyzer (model number: FPIA-3000S, available from Sysmex Corporation). A plate-like AlN powder having a high purity is preferably used. The purity of the plate-like AlN powder is preferably 98% by mass or more and more preferably 99% by mass or more. In particular, a metal impurity concentration (concentration of metals other than Al) is preferably 50 ppm by mass or less, and an oxygen concentration is preferably 1% by mass or less and particularly preferably 0.8% by mass or less. However, a component that is the same as the sintering aid or impurities that volatilize and disappear during sintering may be contained.

The AlN raw-material powder may be the plate-like AlN powder itself. Alternatively, the AlN raw-material powder may be a mixed AlN powder in which a plate-like AlN powder and a spherical AlN powder are mixed. The average particle size of the spherical AlN powder is preferably smaller than the average particle size of the plate-like AlN powder and is preferably 1.5 µm or less. When such a mixed AlN powder is used as the AlN raw-material powder, during sintering, the plate-like AlN powder is formed into a seed crystal (template), the spherical AlN powder is formed into a matrix, and the template is homoepitaxially grown while incorporating the matrix. This production method is referred to as a templated grain growth (TGG) method. The mass ratio of the plate-like AlN powder to the spherical AlN powder is appropriately determined in consideration of the aspect ratio and the average particle size of the plate-like AlN powder. For example, with an increase in the average particle size of the plate-like AlN powder, the mass ratio of the plate-like AlN powder to the spherical AlN powder may be decreased.

The sintering aid has a function of promoting sintering of AlN. Since AlN is less likely to sinter than alumina and the like, it is preferable to add such a sintering aid and to perform hot-press sintering. The sintering aid is preferably a volatile sintering aid. This is because volatile sintering aids gasify and are easily removed during normal-pressure sintering after hot-press sintering. As the volatile sintering aid, a complex oxide of Ca and Al or a rare-earth oxide such as yttria is preferably used. Examples of the complex oxide of Ca and Al include complex oxides that contain CaO and $Al_2O_3$ in appropriate ratios, such as C2A, C3A, and C4A. The sintering aid is preferably used in an amount of 1% to 10% by mass and more preferably 2% to 8% by mass relative to the total mass of the plate-like AlN powder, the spherical AlN powder, and the sintering aid.

In the first step, a formed body is prepared by forming a mixture obtained by mixing a sintering aid with an AlN raw-material powder, in which the mixture is formed such that the plate surface of the plate-like AlN powder is disposed along a surface of the formed body. Consequently, since the c-axis of the plate-like AlN powder is easily arranged in the direction orthogonal to the surface of the formed body, the degree of c-plane orientation of the AlN sintered body improves. Examples of the forming method in this case include, but are not particularly limited to, tape casting, extrusion molding, cast molding, injection molding, and uniaxial pressing. A multilayer formed body may be prepared by stacking a plurality of formed bodies obtained by any of these forming methods.

In the second step, an oriented AlN sintered body is obtained by subjecting the formed body obtained in the first step to hot-press sintering while applying a pressure to the surface of the formed body. Before the hot-press sintering, degreasing may be performed. The atmosphere of the hot-press sintering is preferably a non-oxidizing atmosphere such as a nitrogen atmosphere, an argon atmosphere, or a vacuum. The pressure (surface pressure) of the hot-press sintering is preferably 50 kgf/cm$^2$ or more and preferably 200 kgf/cm$^2$ or more. The temperature (maximum attained temperature) of the hot-press sintering is preferably 1,800° C. to 1,950° C. and more preferably 1,880° C. to 1,920° C. The time of the hot-press sintering is not particularly limited but is appropriately determined in a range of, for example, 2 to 10 hours. The furnace for the hot-press sintering is not particularly limited. For example, a furnace made of graphite can be used.

In the third step, a transparent AlN sintered body is obtained by sintering the oriented AlN sintered body obtained in the second step at normal pressure to remove a component derived from the sintering aid. The oriented AlN sintered body obtained in the second step has a high degree of c-plane orientation determined by a Lotgering method but has a low in-line transmittance because a grain boundary phase that contains a component derived from the sintering aid is present between AlN sintered grains. Accordingly, in the third step, the in-line transmittance of the oriented AlN sintered body is improved by removing the grain boundary phase (component derived from the sintering aid) that is present between AlN sintered grains. The atmosphere of the normal-pressure sintering is preferably a non-oxidizing atmosphere such as a nitrogen atmosphere or an argon atmosphere. The temperature (maximum attained temperature) of the normal-pressure sintering is preferably 1,750° C. to 1,950° C. and more preferably 1,800° C. to 1,920° C. The time of the normal-pressure sintering is not particularly limited but is appropriately determined in a range of, for example, 20 to 100 hours. The furnace for the normal-pressure sintering is not particularly limited. For example, a sagger made of AlN can be used.

The transparent AlN sintered body according to the present embodiment is a polycrystalline structure, in which a degree of c-plane orientation is 70% or more as determined by the Lotgering method, and an in-line transmittance at a wavelength of 450 nm is 48% or more. This transparent AlN sintered body can be suitably produced by the above method for producing a transparent AlN sintered body. An in-line transmittance of such a transparent AlN sintered body at a wavelength of 600 nm is usually equal to or higher than the in-line transmittance at a wavelength of 450 nm.

The transparent AlN sintered body according to the present embodiment has a high degree of c-plane orientation and thus has good plasma resistance and piezoelectric properties. Therefore, the transparent AlN sintered body is useful as a material of members for which plasma resistance is required, such as members for semiconductor manufacturing apparatuses, and a material of members for which high piezoelectric properties are required, such as sensors for high temperatures. Since the transparent AlN sintered body has a high in-line transmittance, the transparent AlN sintered body is more transparent than existing AlN sintered bodies. Furthermore, properties inherent to AlN, such as high thermal conductivity, high refractive index, and high crystallinity, are maintained as they are. Therefore, the transparent AlN sintered body is also useful as a transparent, high thermal conductivity member, a transparent, high refractive index member, and a transparent, highly crystalline member. Examples of the transparent, high thermal conductivity member include phosphor substrates for ultra-high brightness LEDs, heat spreaders for solid-state laser crystals, and transparent mounting substrates for LEDs. The use of the transparent AlN sintered body as a phosphor substrate for an ultra-high brightness LED can suppress a decrease in the luminous efficiency due to an excessive increase in the temperature of the phosphor. The use of the transparent AlN sintered body as a heat spreader for a solid-state laser crystal can suppress a decrease in the lasing efficiency due to an excessive increase in the temperature of the laser crystal. The use of the transparent AlN sintered body as a transparent mounting substrate for an LED can suppress a decrease in the luminous efficiency due to an excessive increase in the temperature of the LED. Examples of the transparent, high refractive index member include high refractive index lenses for ultraviolet lasers. The use of the transparent AlN sintered body as such a lens enables the realization of high amount of light, short focus, and high resolution. Examples of the transparent, highly crystalline member include base substrates for forming ultraviolet AlN-LEDs. The use of the transparent AlN sintered body as such a base substrate enables the realization of high quality/low defect and high heat dissipation of a functional layer.

In the transparent AlN sintered body according to the present embodiment, the relative density is preferably 99.1% or more, more preferably 99.8% or more, and still more preferably 100%. This is because transparency increases and plasma resistance also improves with an increase in the relative density. The oxygen content is preferably 600 ppm by mass or less. The content of impurity metals is preferably 40 ppm by mass or less. This is because transparency increases with a decrease in the content of impurity metals. The impurity metals refer to metals segregated at grain boundaries without forming solid solutions, the metals being other than Al and the sintering aid added. The degree of c-plane orientation is preferably 95% or more, more preferably 97% or more, and still more preferably 100%. The in-line transmittance at a wavelength of 450 nm is preferably 60% or more and more preferably 65% or more.

Here, FIGS. 1A to 1D illustrate an example of steps of producing an AlN sintered body by the TGG method. First, a plate-like AlN powder 10 is prepared (refer to FIG. 1A). The plate-like AlN powder 10 has a plate surface 10*a* which is a c-plane. Next, a formed body 20 is produced by using a mixed AlN powder in which the plate-like AlN powder 10, a spherical AlN powder 12, and a sintering aid 14 are mixed (first step, refer to FIG. 1B). At this time, the formed body 20 is produced such that the plate surface 10*a* (c-plane) of the plate-like AlN powder 10 is arranged along a surface 20*a* of the formed body 20. Next, the formed body 20 is subjected to hot-press sintering while applying a pressure from a direction substantially perpendicular to the surface 20*a* (second step, refer to FIG. 1C). Consequently, the sintering of the plate-like AlN powder 10 and the spherical AlN powder 12 is promoted by the sintering aid 14. Since the plate surface 10*a* (c-plane) of the plate-like AlN powder 10 is arranged along the surface 20a of the formed body 20, the sintering proceeds while the plate-like AlN powder 10 functions as a template. As a result, an oriented AlN sintered body 30 having a high degree of c-plane orientation is obtained. A grain boundary phase 34 that contains a component derived from the sintering aid 14 is present between AlN sintered grains 32 in the oriented AlN sintered body 30. Subsequently, the oriented AlN sintered body 30 is sintered at normal pressure in a non-oxidizing atmosphere to remove the component derived from the sintering aid 14, thus obtaining a transparent AlN sintered body 40 (third step, refer to FIG. 1D). As a result, a transparent AlN sintered body 40 having both a high degree of c-plane orientation and a high in-line transmittance is obtained.

EXAMPLES

TABLE 1

| | Composition | | | | | | | |
|---|---|---|---|---|---|---|---|---|
| | | Plate-like AlN powder | | | | Sintering aid | | |
| Experimental example | Usage of spherical AlN powder (% by mass) | Average particle size (μm) | Average thickness (μm) | Aspect ratio | Usage (% by mass) | Composition | Amount of added (% by mass) | Plate-like/spherical (mass ratio) |
| 1 | 47.6 | 2 | 0.08 | 25 | 47.6 | C3A | 4.8 | 1.0 |
| 2 | 28.56 | 2 | 0.08 | 25 | 66.64 | C3A | 4.8 | 2.3 |
| 3 | 19.04 | 2 | 0.08 | 25 | 76.16 | C3A | 4.8 | 4.0 |
| 4 | 57.12 | 5 | 0.07 | 70 | 38.08 | C3A | 4.8 | 0.7 |
| 5 | 47.6 | 5 | 0.07 | 70 | 47.6 | C3A | 4.8 | 1.0 |
| 6 | 38.08 | 5 | 0.07 | 70 | 57.12 | C3A | 4.8 | 1.5 |
| 7 | 66.64 | 7 | 0.1 | 70 | 28.56 | C3A | 4.8 | 0.4 |
| 8 | 57.12 | 7 | 0.1 | 70 | 38.08 | C3A | 4.8 | 0.7 |
| 9 | 47.6 | 7 | 0.1 | 70 | 47.6 | C3A | 4.8 | 1.0 |
| 10 | 19.04 | 2 | 0.08 | 25 | 76.16 | C4A | 4.8 | 4.0 |
| 11 | 19.04 | 2 | 0.08 | 25 | 76.16 | C2A | 4.8 | 4.0 |
| 12 | 19.52 | 2 | 0.08 | 25 | 78.08 | C3A | 2.4 | 4.0 |
| 13 | 18.56 | 2 | 0.08 | 25 | 74.24 | C3A | 7.2 | 4.0 |
| 14 | 19.04 | 2 | 0.08 | 25 | 76.16 | C3A | 4.8 | 4.0 |
| 15 | 19.04 | 2 | 0.08 | 25 | 76.16 | C3A | 4.8 | 4.0 |
| 16 | 83.52 | 2 | 0.08 | 25 | 9.28 | C3A | 4.8 | 0.1 |

TABLE 2

| | Composition | | | | | | | |
|---|---|---|---|---|---|---|---|---|
| | | Plate-like AlN powder | | | | Sintering aid | | |
| Experimental example | Usage of spherical AlN powder (% by mass) | Average particle size (μm) | Average thickness (μm) | Aspect ratio | Usage (% by mass) | Composition | Amount of added (% by mass) | Plate-like/spherical (mass ratio) |
| 17 | 0 | 10 | 0.33 | 30 | 95.2 | C3A | 4.8 | — |
| 18 | 0 | 18 | 0.33 | 55 | 95.2 | C3A | 4.8 | — |
| 19 | 47.6 | 28 | 7 | 4 | 47.6 | C3A | 4.8 | 1.0 |
| 20 | 47.6 | 1.2 | 1 | 1 | 47.6 | C3A | 4.8 | 1.0 |
| 21 | 47.6 | 3 | 1 | 3 | 47.6 | C3A | 4.8 | 1.0 |
| 22 | 47.6 | 3 | 1.5 | 2 | 47.6 | C3A | 4.8 | 1.0 |
| 23 | 47.6 | 10 | 0.33 | 30 | 47.6 | C3A | 4.8 | 1.0 |
| 24 | 47.6 | 10 | 0.5 | 20 | 47.6 | C3A | 4.8 | 1.0 |
| 25 | 47.6 | 10 | 1 | 10 | 47.6 | C3A | 4.8 | 1.0 |
| 26 | 47.6 | 10 | 1.8 | 6 | 47.6 | C3A | 4.8 | 1.0 |
| 27 | 47.6 | 10 | 2 | 5 | 47.6 | C3A | 4.8 | 1.0 |
| 28 | 47.6 | 18 | 1.8 | 10 | 47.6 | C3A | 4.8 | 1.0 |
| 29 | 47.6 | 15 | 1.5 | 10 | 47.6 | C3A | 4.8 | 1.0 |
| (25 | 47.6 | 10 | 1 | 10 | 47.6 | C3A | 4.8 | 1.0) |
| 30 | 47.6 | 5 | 0.5 | 10 | 47.6 | C3A | 4.8 | 1.0 |
| 31 | 47.6 | 1.2 | 0.12 | 10 | 47.6 | C3A | 4.8 | 1.0 |
| 32 | 47.6 | 5 | 0.33 | 15 | 47.6 | C3A | 4.8 | 1.0 |
| (23 | 47.6 | 10 | 0.33 | 30 | 47.6 | C3A | 4.8 | 1.0) |
| 33 | 47.6 | 18 | 0.33 | 55 | 47.6 | C3A | 4.8 | 1.0 |
| 34 | 47.6 | 21 | 0.33 | 64 | 47.6 | C3A | 4.8 | 1.0 |
| 35 | 47.6 | 10 | 0.33 | 30 | 47.6 | C3A | 4.8 | 1.0) |
| (23 | 47.6 | 10 | 0.33 | 30 | 47.6 | C3A | 4.8 | 1.0 |

TABLE 3

| Experimental example | Formed body Degree of c-plane orientation (%) | Primary sintering condition Maximum temperature (° C.) | Primary sintering condition Holding time (h) | ※1 Sintering method | AlN sintered body after primary sintering Metal impurity concentration (ppm) | AlN sintered body after primary sintering Amount of Oxygen (ppm) | AlN sintered body after primary sintering Relative density (%) | AlN sintered body after primary sintering Degree of c-plane orientation (%) | Secondary sintering condition Maximum temperature (° C.) |
|---|---|---|---|---|---|---|---|---|---|
| 1 | 10 | 1850 | 5 | HP | 20900 | 16400 | 100 | 70 | 1900 |
| 2 | 14 | 1850 | 5 | HP | 20600 | 16200 | 99.9 | 98 | 1900 |
| 3 | 16 | 1850 | 5 | HP | 20700 | 16300 | 99.9 | 100 | 1900 |
| 4 | 9 | 1850 | 5 | HP | 20800 | 16300 | 99.7 | 76 | 1900 |
| 5 | 12 | 1850 | 5 | HP | 20900 | 16200 | 100 | 97 | 1900 |
| 6 | 14 | 1850 | 5 | HP | 20800 | 16300 | 100 | 100 | 1900 |
| 7 | 9 | 1850 | 5 | HP | 20700 | 16400 | 99.5 | 73 | 1900 |
| 8 | 12 | 1900 | 5 | HP | 11000 | 9300 | 99.5 | 97 | 1900 |
| 9 | 15 | 1900 | 5 | HP | 11400 | 9700 | 99.4 | 100 | 1900 |
| 10 | 16 | 1850 | 5 | HP | 22800 | 15700 | 100 | 100 | 1900 |
| 11 | 16 | 1850 | 5 | HP | 17200 | 17900 | 99.6 | 100 | 1900 |
| 12 | 17 | 1850 | 5 | HP | 10600 | 8500 | 99.1 | 100 | 1900 |
| 13 | 15 | 1850 | 5 | HP | 30200 | 24600 | 99.6 | 98 | 1900 |
| 14 | 16 | 1800 | 10 | HP | 21100 | 17100 | 99.3 | 99 | 1900 |
| 15 | 16 | 1900 | 2 | HP | 11200 | 9200 | 100 | 100 | 1900 |
| 16 | 4 | 1880 | 5 | Normal pressure | 17600 | 18000 | 99 | 44 | 1880 |

| Experimental example | Secondary sintering condition Holding time (h) | AlN sintered body after secondary sintering Metal impurity concentration (ppm) *2 | AlN sintered body after secondary sintering Amount of Oxygen (ppm) | AlN sintered body after secondary sintering Relative density (%) | AlN sintered body after secondary sintering Degree of c-plane orientation (%) | AlN sintered body after secondary sintering Average particle size (μm) | In-line transmittance (%) 450 nm | In-line transmittance (%) 600 nm |
|---|---|---|---|---|---|---|---|---|
| 1 | 75 | 34 | 300 | 99.8 | 72 | 24 | 49 | 51 |
| 2 | 75 | 28 | 300 | 99.8 | 99 | 23 | 65 | 66 |
| 3 | 75 | 35 | 300 | 99.8 | 100 | 24 | 67 | 68 |
| 4 | 75 | 31 | 300 | 99.6 | 78 | 22 | 48 | 50 |
| 5 | 75 | 29 | 300 | 99.9 | 98 | 23 | 65 | — |
| 6 | 75 | 36 | 300 | 99.9 | 100 | 24 | 69 | 70 |
| 7 | 75 | 31 | 300 | 99.4 | 74 | 20 | 50 | 52 |
| 8 | 75 | 30 | 300 | 99.4 | 97 | 21 | 63 | — |
| 9 | 75 | 35 | 300 | 99.3 | 100 | 20 | 66 | — |
| 10 | 75 | 31 | 300 | 99.8 | 100 | 23 | 67 | — |
| 11 | 75 | 36 | 400 | 99.6 | 100 | 21 | 65 | — |
| 12 | 75 | 30 | 400 | 99.1 | 100 | 18 | 64 | — |
| 13 | 75 | 31 | 600 | 99.3 | 100 | 20 | 65 | — |
| 14 | 75 | 29 | 500 | 99.1 | 100 | 19 | 63 | — |
| 15 | 75 | 36 | 300 | 100 | 100 | 25 | 71 | 72 |
| 16 | 50 | 30 | 300 | 99 | 47 | 16 | 1 | 1 |

※1 HP is an abbreviation of hot press.
*2 The amount of impurity metals segregated at grain boundary without forming solid solutions, the metals being other than the aid

TABLE 4

| Experimental example | Formed body Degree of c-plane orientation (%) | Primary sintering condition Maximum temperature (° C.) | Primary sintering condition Holding time (h) | ※1 Sintering method | AlN sintered body after primary sintering Metal impurity concentration (ppm) | AlN sintered body after primary sintering Amount of Oxygen (ppm) | AlN sintered body after primary sintering Relative density (%) | AlN sintered body after primary sintering Degree of c-plane orientation (%) | Secondary sintering condition Maximum temperature (° C.) |
|---|---|---|---|---|---|---|---|---|---|
| 17 | 45 | 1900 | 10 | HP | 12000 | 11000 | 100 | 100 | 1900 |
| 18 | 56 | 1900 | 10 | HP | 12000 | 11000 | 100 | 100 | 1900 |
| 19 | 10 | 1900 | 10 | HP | 12500 | 11500 | 96 | 92 | 1900 |
| 20 | 2 | 1900 | 10 | HP | 11800 | 11500 | 100 | 10 | 1900 |
| 21 | 6 | 1900 | 10 | HP | 12100 | 11500 | 100 | 71 | 1900 |
| 22 | 4 | 1900 | 10 | HP | 12000 | 11500 | 100 | 40 | 1900 |
| 23 | 20 | 1900 | 10 | HP | 11400 | 10000 | 100 | 100 | 1900 |
| 24 | 18 | 1900 | 10 | HP | 12100 | 11600 | 100 | 99 | 1900 |
| 25 | 17 | 1900 | 10 | HP | 12200 | 11700 | 100 | 98 | 1900 |
| 26 | 15 | 1900 | 10 | HP | 11900 | 11500 | 99.2 | 96 | 1900 |
| 27 | 10 | 1900 | 10 | HP | 12000 | 11400 | 98.5 | 95 | 1900 |

TABLE 4-continued

| 28 | 15 | 1900 | 10 | HP | 11400 | 10000 | 99.2 | 95 | 1900 |
| 29 | 14 | 1900 | 10 | HP | 11600 | 10000 | 99.2 | 95 | 1900 |
| (25 | 17 | 1900 | 10 | HP | 12200 | 11700 | 100 | 98 | 1900 |
| 30 | 14 | 1900 | 10 | HP | 11400 | 10000 | 100 | 96 | 1900 |
| 31 | 12 | 1900 | 10 | HP | 12300 | 11700 | 100 | 80 | 1900 |
| 32 | 14 | 1900 | 10 | HP | 11400 | 10000 | 100 | 100 | 1900 |
| (23 | 20 | 1900 | 10 | HP | 11400 | 10000 | 100 | 100 | 1900 |
| 33 | 30 | 1900 | 10 | HP | 11400 | 10000 | 100 | 100 | 1900 |
| 34 | 35 | 1900 | 10 | HP | 12300 | 11700 | 98 | 100 | 1900 |
| 35 | 20 | 1900 | 10 | HP | 12100 | 10700 | 100 | 100 | 1900 |
| (23 | 20 | 1900 | 10 | HP | 11400 | 10000 | 100 | 100 | 1900 |

| Experimental example | Secondary sintering condition Holding time (h) | AlN sintered body after secondary sintering | | | | | | |
|---|---|---|---|---|---|---|---|---|
| | | Metal impurity concentration (ppm) *2 | Amount of Oxygen (ppm) | Relative density (%) | Degree of c-plane orientation (%) | Average particle size (μm) | In-line transmittance (%) | |
| | | | | | | | 450 nm | 600 nm |
| 17 | 75 | 39 | 300 | 100 | 100 | 30 | 71 | 72 |
| 18 | 75 | 39 | 300 | 100 | 100 | 31 | 71 | 72 |
| 19 | 75 | 36 | 300 | 96.1 | 92 | 30 | 48 | 49 |
| 20 | 75 | 35 | 300 | 100 | 13 | 32 | 1 | 1 |
| 21 | 75 | 35 | 300 | 100 | 72 | 31 | 51 | 52 |
| 22 | 75 | 35 | 300 | 100 | 42 | 30 | 1 | 1 |
| 23 | 75 | 35 | 300 | 100 | 100 | 27 | 70 | 71 |
| 24 | 75 | 36 | 300 | 100 | 99 | 30 | 67 | 68 |
| 25 | 75 | 35 | 300 | 100 | 98 | 29 | 66 | 67 |
| 26 | 75 | 35 | 300 | 99.3 | 97 | 28 | 65 | 65 |
| 27 | 75 | 35 | 300 | 98.6 | 96 | 27 | 49 | 51 |
| 28 | 75 | 34 | 300 | 99.3 | 96 | 31 | 65 | 67 |
| 29 | 75 | 32 | 300 | 99.2 | 96 | 31 | 65 | 66 |
| (25 | 75 | 35 | 300 | 100 | 98 | 29 | 66 | 67 |
| 30 | 75 | 33 | 300 | 100 | 96 | 29 | 65 | 65 |
| 31 | 75 | 37 | 300 | 100 | 80 | 30 | 50 | 51 |
| 32 | 75 | 32 | 300 | 100 | 100 | 28 | 70 | 71 |
| (23 | 75 | 35 | 300 | 100 | 100 | 27 | 70 | 71 |
| 33 | 75 | 34 | 300 | 100 | 100 | 29 | 70 | 71 |
| 34 | 75 | 37 | 300 | 98.3 | 100 | 32 | 49 | 51 |
| 35 | 75 | 55 | 300 | 100 | 100 | 26 | 55 | 56 |
| (23 | 75 | 35 | 300 | 100 | 100 | 27 | 70 | 71 |

*1 HP is an abbreviation of hot press.
*2 The amount of impurity metals segregated at grain boundary without forming solid solutions, the metals being other than the aid Experimental Examples 1 to 35

1. Method for Producing Highly Oriented AlN Sintered Body (1) Synthesis of Plate-Like AlN Powder One hundred grams of a plate-like alumina (available from Kinsei Matec Co., Ltd.), 50 g of carbon black (Mitsubishi Chemical Corporation), 1,000 g of ϕ2 alumina balls, and 350 mL of IPA (TOKUSO IPA, available from Tokuyama Corporation) were each weighed and put in a poly-pot container, and pulverization and mixing were conducted at 30 rpm for 240 minutes. A plate-like alumina having an average particle size of 2 μm, 5 μm, or 7 μm was used as the plate-like alumina. The plate-like alumina having an average particle size of 2 μm had an average thickness of 0.08 μm and an aspect ratio of 25. The plate-like alumina having an average particle size of 5 μm had an average thickness of 0.07 μm and an aspect ratio of 70. The plate-like alumina having an average particle size of 7 μm had an average thickness of 0.1 μm and an aspect ratio of 70. Subsequently, drying was conducted with a rotary evaporator. The dried plate-like alumina-carbon mixture was slightly pulverized with a mortar. A carbon crucible was filled with 100 g of the mixture and placed in a high-temperature atmosphere furnace. While nitrogen was allowed to flow at a rate of 3 L/min, the temperature was increased to 1,600° C. at a temperature-increasing rate of 200° C./hr, and the crucible was held at the temperature for 20 hours. After the completion of the reaction, natural cooling was performed, and a sample was removed from the crucible. In order to remove remaining carbon, the sample was further heat-treated at 650° C. for 10 hours in an oxidizing atmosphere using a muffle furnace. Thus, a plate-like AlN powder was obtained.

In Experimental Examples 1 to 35, plate-like AlN powders having various average particle sizes, average thicknesses, and aspect ratios were used. These plate-like AlN powders were produced by preparing plate-like alumina powders having different shapes, and nitriding the plate-like alumina powders. The plate-like alumina powders having different shapes were prepared as described below. First, gibbsite aluminum hydroxide was subjected to wet pulverization to adjust the average particle size to 0.4 to 3 μm. Orthophosphoric acid was added in an amount of $1.0\times10^{-5}$ to $1.0\times10^{-2}$ moles relative to one mole of aluminum hydroxide to form a slurry. An increase in the average particle size of aluminum hydroxide increases the average particle size of alumina. An increase in the amount of orthophosphoric acid added increases the aspect ratio. The resulting slurry was granulated and dried at a drying temperature of 140° C. by using a spray dry (Model: FL-12, available from Ohkawara Kakohki Co., Ltd.), so that the content of water in the raw material was less than 1% by weight. The resulting powder was formed into a 50 wt % aqueous slurry and then subjected to hydrothermal synthesis at a synthesis temperature of 600° C. and a pressure of 15 MPa. After the hydrothermal synthesis, the resulting product was washed with water and dried to obtain white alumina particles. The particle size of alumina can be decreased without changing the aspect ratio by adding a part of the orthophosphoric acid to water used for the hydrothermal synthesis without adding the part of the orthophosphoric acid in the formation of the slurry.

Figure 2:
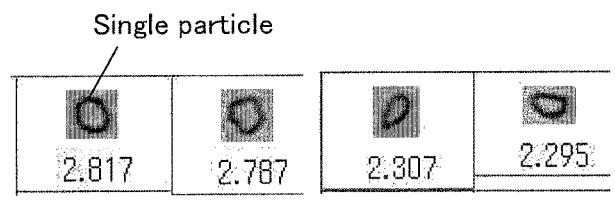
FIG. 2 includes photographs each showing an image of a single particle of a plate-like AlN powder.
Figure 3:
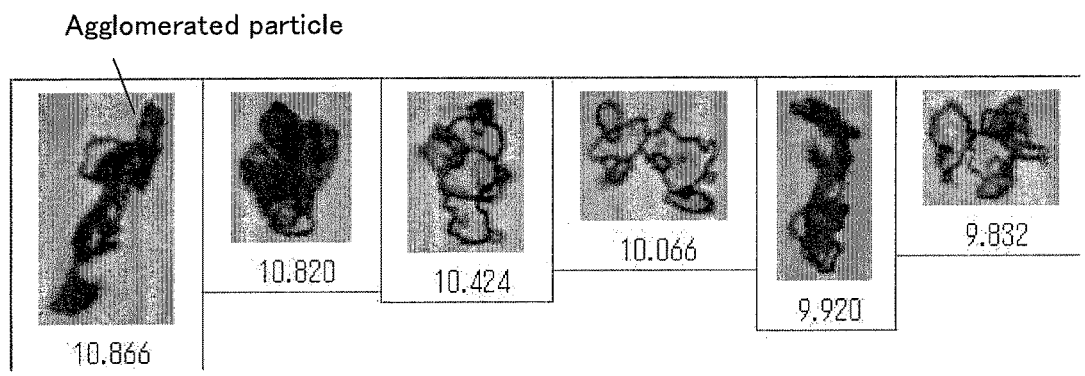
FIG. 3 includes photographs each showing an image of an agglomerated particle of a plate-like AlN powder.
Figure 4:
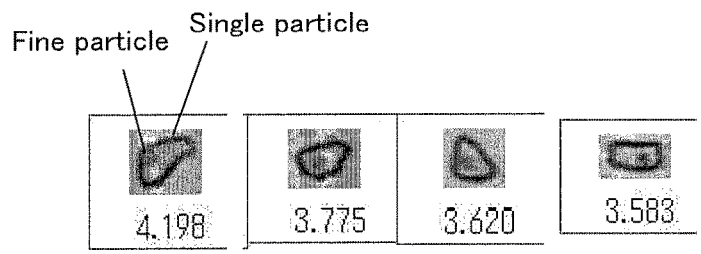
FIG. 4 includes photographs each showing an image of a particle that includes a single particle of a plate-like AlN powder and a fine particle adhering to the single particle.

Since the plate-like AlN powder prepared above included single particles and agglomerated particles, the single particles were selected by performing disintegration and classification. Specifically, 100 g of the prepared plate-like AlN powder, 300 g of alumina balls having a diameter $\phi$ of 15 mm, and 60 mL of IPA (TOKUSO IPA, available from Tokuyama Corporation) were put in a poly-pot container, and disintegration was conducted at 30 rpm for 240 minutes. Subsequently, drying was conducted with a rotary evaporator. The dried plate-like AlN powder was classified with a precise air classifier (model number: TC-15NSC) available from Nisshin Engineering Inc. The classification point was set to the same size as the average particle size, and fine particles after classification were used as the raw material. An image of the finally obtained plate-like AlN powder was observed with a wet flow-type particle size/shape analyzer (FPIA-3000S, available from Sysmex Corporation), and it was confirmed that the plate-like AlN powder was formed of single particles. FIGS. 2 to 4 show an example of images of an AlN powder, the images being obtained by this analyzer. FIG. 2 includes images of a single particle, FIG. 3 includes images of an agglomerated particle, and FIG. 4 includes images of a particle that includes a single particle and a fine particle adhering to the single particle. The numerical values indicated under the images each represents a length of the plate surface in the long-axis direction, that is, a particle size ($\mu$m). Herein, a particle that includes a single particle and a fine particle adhering to the single particle was also considered as a single particle. Note that the average particle size and the average thickness of the plate-like AlN powder were considered to be the same as those of the plate-like alumina powder used.

(2) Synthesis of Sintering Aid (Ca—Al—O-Based Aid)

C3A was synthesized as described below. First, 56 g of calcium carbonate (Shilver-W, available from Shiraishi Calcium Kaisha, Ltd.), 19 g of γ-alumina (TM-300D, available from Taimei Chemicals Co., Ltd.), 1,000 g of $\phi$15 alumina balls, and 125 mL of IPA (TOKUSO IPA, available from Tokuyama Corporation) were put in a poly-pot container, and pulverization and mixing were conducted at 110 rpm for 120 minutes. Subsequently, drying was conducted with a rotary evaporator to prepare a mixed powder. An alumina crucible was filled with 70 g of this mixed powder and placed in an air atmosphere furnace. The temperature was increased to 1,250° C. at a temperature-increasing rate of 200° C./hr, and the crucible was held at the temperature for 3 hours. After the completion of the reaction, natural cooling was performed, and a sample was removed from the crucible. C2A was synthesized in the same manner as described above by using 47 g of calcium carbonate and 24 g of alumina to prepare an aid formed from C3A and C12A7. C4A was synthesized by mixing 40 g of C3A and 15 g of $CaCO_3$. A ratio $CaO/Al_2O_3$ (molar ratio) of C3A, C2A, and C4A are 3, 2, and 4, respectively.

(3) Blending of Mixed Powder

The plate-like AlN powder obtained in (1) above, a commercially available spherical AlN powder (F-Grade, average particle size: 1.2 $\mu$m, available from Tokuyama Corporation), and the Ca—Al—O-based aid obtained in (2) above were weighed in the mass ratio shown in Tables 1 and 2 so that the total weight was 20 g. These were put in a poly-pot container together with 300 g of alumina balls having a diameter $\phi$ of 15 mm and 60 mL of IPA (TOKUSO IPA, available from Tokuyama Corporation), and pulverization and mixing were conducted were conducted at 30 rpm for 240 minutes. Subsequently, drying was conducted with a rotary evaporator to prepare a mixed powder.

(4) Preparation of Multilayer Formed Body

To 100 parts by mass of the mixed powder prepared in (3) above, 7.8 parts by mass of polyvinyl butyral (product number: BM-2, available from Sekisui Chemical Co., Ltd.) serving as a binder, 3.9 parts by mass of di(2-ethylhexyl) phthalate (available from Kurogane Kasei Co., Ltd.) serving as a plasticizer, 2 parts by mass of sorbitan trioleate (RHE-ODOL SP-030, available from Kao Corporation) serving as a dispersant, and 2-ethylhexanol serving as a dispersion medium were added, the resulting mixture was mixed. The amount of the dispersion medium was adjusted such that the resulting slurry had a viscosity of 20,000 cp. A tape cast body was prepared by using the slurry prepared in this manner. Specifically, the slurry was cast by a doctor blade method on a PET film to form a sheet-like tape cast body having a dry thickness of 100 $\mu$m such that the plate surface (c-plane) of the plate-like AlN powder was arranged along the surface of the tape cast body. The resulting tape cast body was cut into circular pieces each having a diameter of 20 mm. Subsequently, 40 circular pieces were stacked. The resulting stacked body was placed on an Al plate having a thickness of 10 mm and then placed in a package. The package was evacuated to prepare a vacuum package. The vacuum package was isostatically pressed in hot water at 85° C. at a pressure of 100 kgf/cm$^2$ to prepare a disk-shaped multilayer formed body.

(5) Primary Sintering

The multilayer formed body obtained in (4) above was placed in a degreasing furnace and degreased at 600° C. for 10 hours. In Experimental Examples 1 to 15 and 17 to 35, primary sintering was performed under the primary sintering conditions shown in Tables 3 and 4 to obtain AlN sintered bodies after primary sintering. Specifically, degreased bodies were sintered by hot-pressing in nitrogen using a graphite mold at a sintering temperature (maximum attained temperature) of 1,800° C. to 1,900° C. for 2 to 10 hours at a surface pressure of 200 kgf/cm$^2$ to obtain AlN sintered bodies after primary sintering. The direction in which the pressure was applied during hot-pressing was a stacking direction of the multilayer formed body (a direction substantially perpendicular to the surface of the tape cast body). When the temperature was decreased from the sintering temperature, the pressure during pressing was maintained until the temperature reached room temperature. In Experimental Example 16, as shown in Table 3, the resulting degreased body was sintered in nitrogen at normal pressure at a sintering temperature (maximum attained temperature) of 1,880° C. for 5 hours to obtain an AlN sintered body after primary sintering.

(6) Secondary Sintering

In Experimental Examples 1 to 15 and 17 to 35, the AlN sintered bodies after primary sintering were sintered under the secondary sintering conditions shown in Tables 3 and 4 to obtain AlN sintered bodies after secondary sintering. Specifically, a surface of each of the AlN sintered bodies after primary sintering obtained in (5) above was ground to prepare a sample having a shape with a diameter φ of 20 mm and a thickness of 1.5 mm. A sagger made of aluminum nitride was filled with the sample, and the sample was sintered in an atmosphere furnace in nitrogen at a sintering temperature (maximum attained temperature) of 1,900° C. for 75 hours. Thus, AlN sintered bodies after secondary sintering were obtained. In Experimental Example 16, as shown in Table 3, the AlN sintered body after primary sintering was ground to prepare a sample having a shape with a diameter φ of 20 mm and a thickness of 1.5 mm. A sagger made of aluminum nitride was filled with the sample, and the sample was sintered in an atmosphere furnace in nitrogen at a sintering temperature (maximum attained temperature) of 1,880° C. for 50 hours to obtain an AlN sintered body after secondary sintering.

2. Evaluation Method (1) Degree of c-Plane Orientation of Formed Body

To examine the degree of orientation of the AlN multilayer formed body prepared above, the disk-shaped AlN multilayer formed body was placed in an XRD apparatus so as to be parallel to the upper surface of the AlN multilayer formed body, and the upper surface was irradiated with X-rays to measure the degree of c-plane orientation. An XRD profile was measured with the XRD apparatus (RINT-TTR III, available from Rigaku Corporation) in a 2θ range of 20° to 70°. Specifically, the measurement was performed using CuKα radiation at a voltage of 50 kV and a current of 300 mA. The degree of c-plane orientation f (%) was calculated by the Lotgering method. Specifically, the degree of c-plane orientation was calculated by formulae described below. In the formulae, P represents a value obtained from the XRD profile of the AlN multilayer formed body, and $P_0$ represents a value calculated from reference AlN (JCPDS card No. 076-0566). Note that (100), (002), (101), (102), (110), and (103) were used as (hkl).

$$f=\{(P-P_0)/(1-P_0)\} \times 100$$

$$P_0=\Sigma I_0(002)/\Sigma I_0(hkl)$$

$$P=\Sigma I(002)/\Sigma I(hkl)$$

(2) Amount of Impurity Metals and Amount of Oxygen of AlN Sintered Body after Primary and Secondary Sintering The amount of impurity metals was analyzed by a method of decomposition with sulfuric acid in a pressurized vessel in accordance with JIS R1649 using an inductively coupled plasma (ICP) emission spectrometer (PS3520UV-DD, available from Hitachi High-Technologies Corporation). Here, the measurement was performed for Si, Fe, Ti, Ca, Mg, K, Na, P, Cr, Mn, Ni, Zn, Ga, Y, and Zr as the impurity metals. The amount of oxygen was measured by an inert gas fusion-infrared absorption spectroscopy in accordance with JIS R1675 (methods for scientific analysis of fine AlN powders for fine ceramics). These are represented in units of ppm by mass.

(3) Measurement of Relative Density of AlN Sintered Body after Primary and Secondary Sintering The bulk density was measured in accordance with JIS R1634 (test methods for density and open porosity of sintered bodies of fine ceramics), and the relative density was calculated on the assumption that the theoretical density is 3.260.

(4) Degree of c-Plane Orientation of AlN Sintered Body after Primary and Secondary Sintering To examine the degree of orientation of the AlN sintered body prepared above, the disk-shaped AlN sintered body was polished so as to be parallel to the upper surface of the AlN sintered body, and the polished surface was then irradiated with X-rays to measure the degree of c-plane orientation. An XRD profile was measured with an XRD apparatus (RINT-TTR III, available from Rigaku Corporation) in a 2θ range of 20° to 70°. Specifically, the measurement was performed using CuKα radiation at a voltage of 50 kV and a current of 300 mA. The degree of c-plane orientation f (%) was calculated by the Lotgering method. Specifically, the degree of c-plane orientation was calculated by formulae described below. In the formulae, P represents a value obtained from the XRD profile of the AlN sintered body, and P0 represents a value calculated from reference AlN (JCPDS card No. 076-0566). Note that (100), (002), (101), (102), (110), and (103) were used as (hkl).

$$f=\{(P-P_0)/(1-P_0)\} \times 100$$

$$P_0=\Sigma I_0(002)/\Sigma I_0(hkl)$$

$$P=\Sigma I(002)/\Sigma I(hkl)$$

(5) Measurement of Grain Size of AlN Sintered Body after Secondary Sintering

The AlN sintered bodies obtained above were cut into pieces each having a size of 10 mm×10 mm. Four pieces were fixed to outermost peripheral portions of a metal platen having a diameter φ of 68 mm at intervals of 90°, polished with a copper lapping plate on which a slurry containing diamond abrasives with a particle size of 9 μm and 3 μm was dripped, and polished for 300 minutes with a buff plate on which a slurry containing a colloidal silica was dripped. Subsequently, the resulting samples each having a size of 10 mm×10 mm×0.5 mm in thickness after polishing were washed with acetone for 3 minutes, ethanol for 3 minutes, and ion-exchange water for 3 minutes in that order. Photographs of the resulting surfaces were taken with a scanning electron microscope (JSM-6390, available from JEOL Ltd). Regarding the magnification during observation, specifically, the measurement was performed by a section method from a photograph taken at a magnification of 1,000 to determine an average grain size of the AlN sintered grains.

(6) Observation of Cross Section of AlN Sintered Body after Primary and Secondary Sintering An arbitrary cross section of the AlN sintered body prepared above was preliminary polished with a diamond abrasive and then polished with a cross-section polisher (CP) (SM-09010, available from JEOL, Ltd). The CP falls under the category of ion milling. A backscattered electron image of the resulting cross section was taken with a scanning electron microscope (JSM-6390, available from JEOL, Ltd.) at a magnification of 2,000.

(7) In-Line Transmittance of AlN Sintered Body after Secondary Sintering

The AlN sintered bodies obtained above were cut into pieces each having a size of 10 mm×10 mm. Four pieces were fixed to outermost peripheral portions of a metal platen having a diameter φ of 68 mm at intervals of 90°, polished with a copper lapping plate on which a slurry containing diamond abrasives with a particle size of 9 μm and 3 μm was dripped, and polished for 300 minutes with a buff plate on which a slurry containing a colloidal silica was dripped. Subsequently, the resulting samples each having a size of 10 mm×10 mm×0.6 mm in thickness after polishing were washed with acetone for 3 minutes, ethanol for 3 minutes, and ion-exchange water for 3 minutes in that order. An in-line transmittance at a wavelength of 450 nm was then measured with a spectrophotometer (Lambda 900, available from Perkin Elmer Co., Ltd). In some Experimental Examples, an in-line transmittance at a wavelength of 600 nm was also measured.

3. Results and Evaluation

Tables 3 and 4 show evaluation results of the AlN sintered bodies after primary sintering and the AlN sintered bodies after secondary sintering. In Experimental Examples 1 to 15, 17 to 19, 21, and 23 to 35, each of the AlN sintered bodies after secondary sintering had a high degree of c-plane orientation of 70% or more and a high in-line transmittance of 48% or more at a wavelength of 450 nm. In contrast, in Experimental Example 16, the AlN sintered body after secondary sintering had a low degree of c-plane orientation of 47% and an in-line transmittance of only 1% because normal-pressure sintering was conducted instead of hot-press sintering when the formed body was sintered. In Experimental Examples 20 and 22, the degrees of c-plane orientation were low, namely, 13% and 42%, respectively, because each of the plate-like AlN powders used had an aspect ratio of less than 3.

The AlN sintered bodies after secondary sintering obtained in Experimental Examples 1 to 15, 17 to 19, 21, and 23 to 35 have good plasma resistance and piezoelectric properties because each of the AlN sintered bodies has a high degree of c-plane orientation of 70% or more. Therefore, the AlN sintered bodies are useful as materials of members for which plasma resistance is required, such as members for semiconductor manufacturing apparatuses, and materials of members for which high piezoelectric properties are required, such as sensors for high temperatures. In addition, since the in-line transmittance at a wavelength of 450 nm is 48% or more, the above AlN sintered bodies are more transparent than existing AlN sintered bodies. Furthermore, properties inherent to AlN, such as high thermal conductivity, high refractive index, and high crystallinity, are maintained as they are. Therefore, the above transparent AlN sintered bodies are also useful as transparent, high thermal conductivity members, transparent, high refractive index members, and transparent, highly crystalline members. In Experimental Examples 1 to 15, 17 to 19, 21, and 23 to 35, hot-press sintering is used without using a rotating magnetic field, which is used in NPL 1. Thus, AlN sintered bodies having high degrees of c-plane orientation can be produced at a low cost compared with the case where a rotating magnetic field is used.

Figure 5:
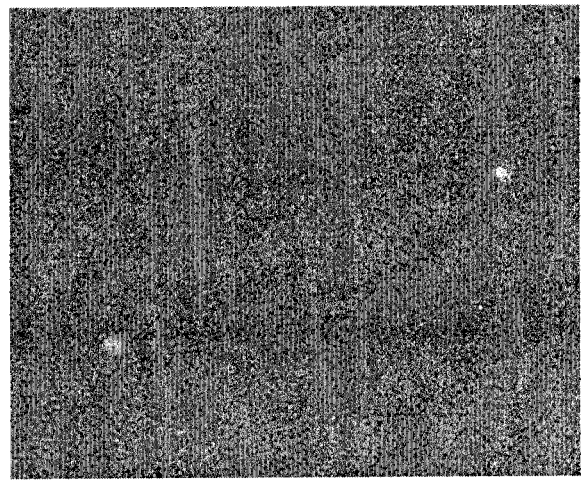
FIG. 5 is a photograph of a backscattered electron image of a cross section of an AlN sintered body after primary sintering.
Figure 6:
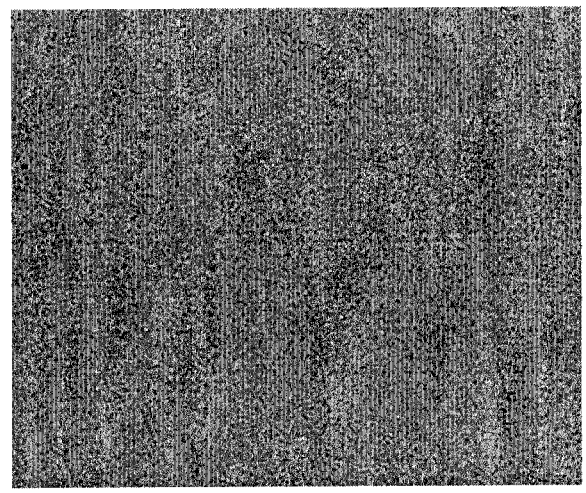
FIG. 6 is a photograph of a backscattered electron image of a cross section of an AlN sintered body after secondary sintering.

FIG. 5 shows a photograph of a backscattered electron image of the AlN sintered body after primary sintering of Experimental Example 3. In FIG. 5, the blackish region is AlN, and the (two) white spots are each a Ca—Al-based oxide (where Ca is a component derived from the sintering aid) contained in a grain boundary phase between AlN sintered grains. Since the average atomic weight of the Ca—Al-based oxide is higher than that of AlN, the Ca—Al-based oxide appears brighter than AlN. Therefore, the Ca—Al-based oxide can be easily distinguished by visual observation. Similarly, FIG. 6 shows a photograph of a backscattered electron image of the AlN sintered body after secondary sintering of Experimental Example 3. In FIG. 6, white spots, that is, the Ca—Al-based oxides disappeared and the whole was made of AlN. Similar photographs of backscattered electron images were obtained in other Experimental Examples (except for Experimental Example 16).

Experimental Examples 1 to 15, 17 to 19, 21, and 23 to 35 correspond to Examples of the present invention, and Experimental Examples 16, 20, and 22 correspond to Comparative Examples. These Experimental Examples do not limit the present invention.

The present application claims priority from Japanese Patent Application No. 2016-247874 filed Dec. 21, 2016 and International Application No. PCT/JP2017/025085 filed Jul. 10, 2017, the entire contents of which are incorporated herein by reference.

What is claimed is:

1. A method for producing a transparent AlN sintered body, comprising:
   a first step of preparing a formed body by forming a mixture obtained by mixing a sintering aid with an AlN raw-material powder containing a plate-like AlN powder whose plate surface is a c-plane and which has an aspect ratio of 3 or more, the mixture being formed such that the plate surface of the plate-like AlN powder is disposed along a surface of the formed body;
   a second step of obtaining an oriented AlN sintered body by subjecting the formed body to hot-press sintering in a non-oxidizing atmosphere while applying a pressure to the surface of the formed body; and
   a third step of obtaining a transparent AlN sintered body by sintering the oriented AlN sintered body at normal pressure in a non-oxidizing atmosphere to remove a component derived from the sintering aid;
   wherein the transparent AlN sintered body has a degree of c-plane orientation of 70% or more as determined by the Lotgering method, and an in-line transmittance at a wavelength of 450 nm of 48% or more.

2. The method for producing a transparent AlN sintered body according to claim 1,
   wherein in the first step, particles contained in the plate-like AlN powder do not agglomerate and are separated from each other.

3. The method for producing a transparent AlN sintered body according to claim 1,
   wherein in the first step, a plurality of tape cast bodies each obtained by forming the mixture into a sheet are stacked to prepare a multilayer formed body, and
   in the second step, the multilayer formed body is subjected to hot-press sintering.

4. The method for producing a transparent AlN sintered body according to claim 1,
   wherein the AlN raw-material powder contains a spherical AlN powder besides the plate-like AlN powder.

5. The method for producing a transparent AlN sintered body according to claim 1,
   wherein the sintering aid is a complex oxide of Ca and Al or a rare-earth oxide.

6. The method for producing a transparent AlN sintered body according to claim 1,
   wherein the plate-like AlN powder has an average thickness of 0.05 to 1.8 µm.

7. The method for producing a transparent AlN sintered body according to claim 1,
   wherein the plate-like AlN powder has an average particle size of 2 to 20 µm.

8. A transparent AlN sintered body having a polycrystalline structure,
   wherein a degree of c-plane orientation is 70% or more as determined by a Lotgering method, and an in-line transmittance at a wavelength of 450 nm is 48% or more.

9. The transparent AlN sintered body according to claim 8, wherein the degree of c-plane orientation is 95% or more, and the in-line transmittance is 60% or more.

10. The transparent AlN sintered body according to claim 8, wherein a relative density is 99.1% or more.

11. The transparent AlN sintered body according to claim 8, wherein a concentration of an impurity metal segregated at a grain boundary without forming a solid solution, the impurity metal being other than Al and a sintering aid, is 40 ppm by mass or less.

* * * * *